United States Patent Office 3,378,244
Patented Apr. 16, 1968

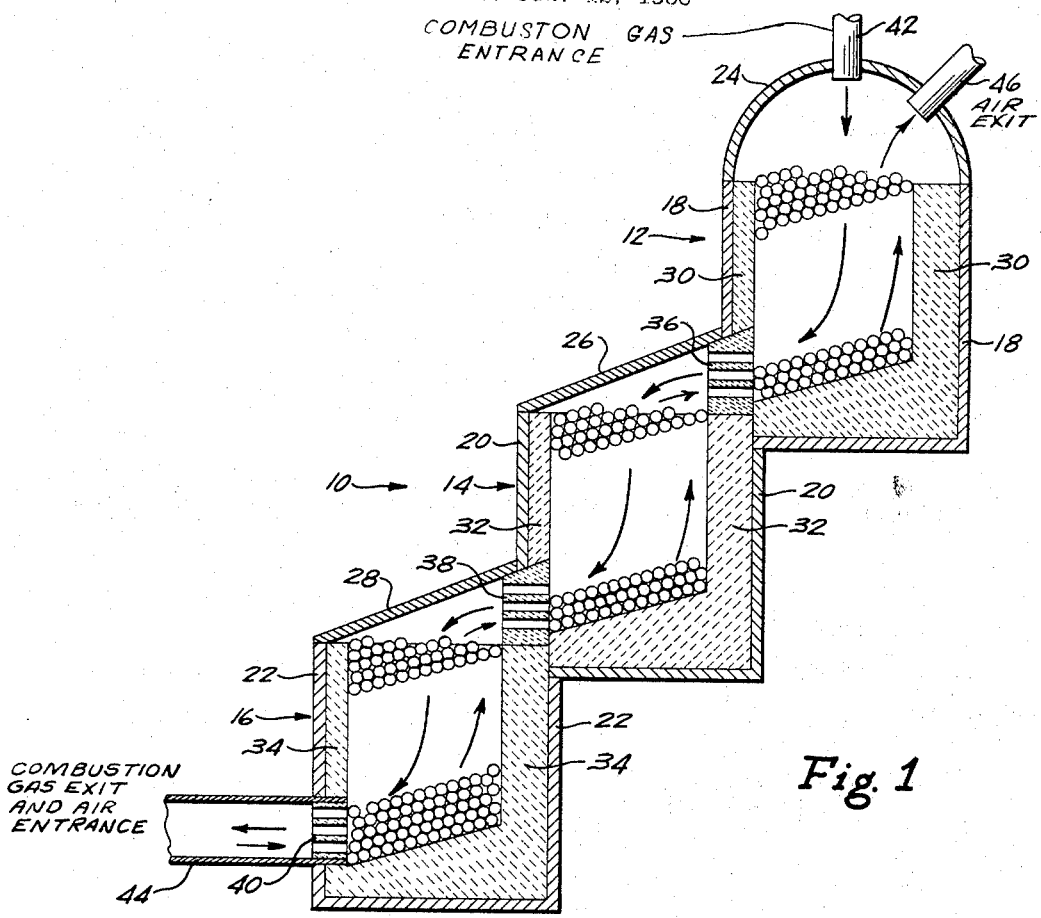
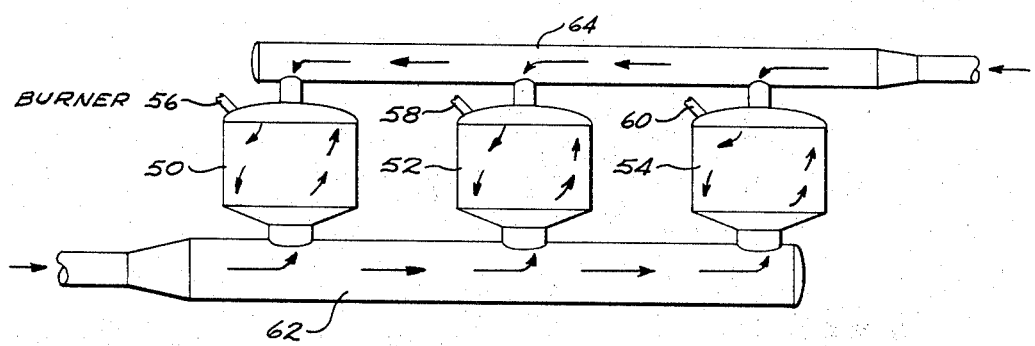

3,378,244
PEBBLE HEAT EXCHANGER
Frank H. Walther, Jr., Bethel Park, Pa., assignor to Dresser Industries, Inc., Dallas, Tex., a corporation of Delaware
Filed Jan. 12, 1966, Ser. No. 520,158
3 Claims. (Cl. 263—19)

ABSTRACT OF THE DISCLOSURE

Pebble heat exchanger consisting of a plurality of interconnected relatively shallow containers for hot pebbles which permits the use of differently chemically composed pebbles in different temperature zones thereof.

---

In recent years, there has become a need for a heat exchange unit capable of heating air to higher temperatures than could be obtained in metallic heaters, that could operate at moderate pressures, and that would maintain a uniform non-fluctuating temperature of the heated air. Such apparatus was also desirable for super heating other gases and for the pyrolysis of hydrocarbons to produce variable products such as ethylene and acetylene, as well as for other reactions and purposes. The pebble heater was developed as a result of these requirements. The pebble heater may be catagorized under two general headings; continuous type and stationary type.

A continuous type pebble heater generally consists of two cylindrical chambers, one above the other, connected by a throat section of reduced diameter. In operation, the two cylindrical chambers and throat section are filled with spherical refractory pellets. By filling the chambers with spherical pellets, a permeable bed is formed through which gases can be made to travel. At the outlet of the bottom chamber, there is a mechanical feeder, usually, which controls the rate at which the refractory pellets flow through the system. After passing through the feeder, the pellets or the pebbles are conveyed continuously by means of an elevator back to the top of the upper chamber. The pellets in the heater move downward at a constant rate during the entire operation. It can be appreciated that in the above type heater, such continuous movement of pebbles within the system renders them highly susceptible to breakage.

The stationary type of pebble heater usually consists of a single chamber or container which is filled with pebbles. At the lower end of the chamber is provided a cold air or gas inlet and at the upper end a hot gas outlet. Also at the upper end, is a means for heating the pebbles to the required temperature. After the fuel and air, which heats the pellets, are introduced at the upper end of the chamber, the products of combustion flow through the stationary bed of pellets causing a temperature gradient between the upper and lower end of the chamber. For example, where the temperature at the upper end of the heater is about 3200° F., the extreme bottom end would measure about 2000° F. The air or gas to be heated is introduced at the lower end of the chamber, passes through a screen to provide uniform distribution, then travels upwardly through the heated pellet bed and leaves at the outlet, having been raised to the required temperature.

Pebbles conventionally used in pebble heater apparatus are substantially spherical in shape and range from about ⅛ inch to about 1 inch in diameter. The pebbles must be formed of a refractory material that will withstand temperatures at least as high as the highest temperature attained in the pebble heating chamber. The pebbles must also be capable of withstanding temperature changes within the apparatus. In order to prevent interreaction between individual heat exchange spheres, they must be of substantially the same chemical composition. Silicon carbide, alumina, periclase, beryllia, zirconia and mullite are generally used to form such pebbles.

Thus, in selecting pebbles for conventional pebble heaters of the stationary type, a single composition must be found which can withstand the high temperatures required without spalling, can withstand temperature changes and can withstand the heavy loading that develops in the intermediate and bottom sections of a pebble bed because of the overlying column of pebbles. A pebble heater used in conjunction with a blast furnace typically measures about six feet in diameter and 12 feet in heighth.

In several pebble heaters of the above dimensions, utilizing about 95% $Al_2O_3$ composition pellets, the spheres were examined after about 1 year of service. Chemical analysis showed minor silcia, iron oxide and lime pick-up. Massive recrystallization of corundum was noted in pebbles from the hotter portions whereas agglomeration and deformation was characteristic of pebbles from the lower portion. Clogging of the bed with eroded finds was considered the cause of agglomeration.

When the above difficulties arise the pebble heater must be removed from service and cleaned out entirely to be replaced with fresh pebbles. As was noted above, a pebble heater was removed from service after about one year. However, the same difficulties occur with less intensity immediately after start-up of a pebble heater so that possibly after about six months of operation, the efficiency of the heater may be reduced by about 50%.

Accordingly, it is an object of the present invention to provide pebble heat exchange apparatus of improved construction.

Another object of the invention is to reduce deformation and agglomeration of pebbles in a pebble bed by unitizing the exchange apparatus.

Another object of the invention is to provide pebble heat exchange apparatus that would allow the use of differently chemically composed pebbles in different temperature zones of the heater.

Another object of the invention is to provide means for removing portions of the pebbles when cleaning or substitution is required, without disturbing the remainder.

Other objects of the invention will, in part, become apparent hereinafter.

In order to more fully understand the nature and objects of the invention, reference should be had to the following detailed description and drawings, in which:

FIG. 1 is a plan view partly in cross-section of a unitized pebble heater according to one aspect of the invention; and, FIG. 2 is an elevation view of a unitized pebble heater in accordance with another aspect of the invention.

In accordance with the present invention, there is provided an improved stationary pebble heat exchange apparatus. The apparatus consists of a plurality of interconnected relatively shallow containers for hot pebbles. Pebbles are disposed in each container in a stationary position. Means are provided for heating the pebbles in each compartment. Common means are located below the chambers and pebbles for forcing a gaseous substance, such as air, upwardly through the pebbles to heat them to a predetermined temperature. Common means are also provided for moving the heated gaseous substance from the containers to the site of use.

Referring to the drawings, specifically FIG. 1, there is shown a pebble heating apparatus 10 consisting of three separate containers or chambers 12, 14 and 16 arranged one above the other in a step-like off-set. Each chamber contains an outer metal shell 18, 20 and 22 which is closed at the upper ends thereof by closure members 24, 26 and 28. Each chamber 12, 14 and 16 contains a refractory lining 30, 32 and 34 adjacent the metal walls 18, 20 and 22 respectively. Each chamber is separated by a refractory grate 36, 38 and 40 which contains a sufficient number of apertures to allow the flow of gases from chamber to chamber but restrict the passage of pebbles therethrough. A heating means 42 is disposed above the upper chamber 12 so as to provide the combustion products thereto whereby the products pass down through each chamber by means of the apertured grates to the lowermost chambers to provide for heating of the pebbles.

After the pebbles are heated, air or other gaseous material is provided at the bottom of the lower most pebble bed 16 by means of a conduit 44. The air rises through the pebble bed upwardly becoming heated in transit whereupon it is removed by means of a conduit 46 and passes to its situs of use.

The above unitized pebble heater reduces the heavy loading that develops in the bottom of a typical stationary pebble bed having a single column of spheres. Further, with the individual pebble units, heat exchange spheres of dissimilar chemical compositions may be employed in each unit without problems of inter-reaction. In addition, if a reaction did develop between the atmosphere and the pebbles in a given unit, the pebbles in that unit could be removed and cleaned or replaced without disturbing the whole column.

Referring to FIG. 2, there is shown another construction for providing a plurality of shallow pebble heater containers as compared with an elongated single bed. Each pebble heater chamber 50, 52 and 54 may be independently heated if desired by means of burners 56, 58 and 60, as is shown in the drawing, or common heating means may be used. At the lower end of the chambers is disposed a pressure chamber 62 wherein air is delivered and forced upwardly and uniformly through the pebbles in each chamber. The heated air is then drawn into a common manifold 64 from each chamber and flows to its situs of use.

While the invention has been described with reference to particular embodiments and examples, it should be understood of course, that modifications, substitutions and the like may be made therein without departing from its scope.

Having thus described the invention in detail and with sufficient particularity as to enable those skilled in the art to practice it, what is desired to have protected by Letters Patent is set forth in the following claims:

I claim:
1. An improved stationary pebble heat exchange apparatus comprising, in combination, a plurality of interconnected, relatively shallow containers for hot pebbles, pebbles disposed in each container in a stationary position, the pebbles in each container being of disimilar chemical composition, means for heating the pebbles in said compartments, common means below said containers for forcing a gaseous substance upwardly therethrough to thereby heat said substance to a predetermined temperature and common means for removing said heated gaseous substance from said containers.

2. Apparatus according to claim 1, in which the containers are arranged side by side.

3. Pebble heat exchange apparatus comprising a plurality of interconnected relatively shallow containers for hot pebbles arranged one above the other in step-like offset, said containers being interconnected by means of apertured stoppers, the apertures being large enough to accommodate the passage of gaseous substances, but smaller than the pebbles in the containers, pebbles disposed in each container in a stationary position, means for heating the pebbles in said compartments, common means below said containers for forcing a gaseous substance upwardly therethrough to thereby heat said substance to a predetermined temperature and common means for removing said heated gaseous substance from said containers.

References Cited
UNITED STATES PATENTS

| | | | |
|---|---|---|---|
| 1,062,122 | 5/1913 | Schroeder et al. | 165—4 XR |
| 1,535,146 | 4/1925 | Brassert et al. | 263—19 |
| 1,588,203 | 6/1926 | Stein | 263—51 |
| 2,769,693 | 11/1956 | Bearer. | |
| 3,060,870 | 10/1962 | Hexdall | 263—51 XR |

FREDERICK L. MATTESON, JR., *Primary Examiner.*

A. D. HERRMANN, *Assistant Examiner.*